United States Patent [19]

Hammarlund

[11] 4,102,198
[45] Jul. 25, 1978

[54] RESISTANCE THERMOMETER MEASURING SYSTEM

[75] Inventor: Gudmar Hammarlund, Vesteras, Sweden

[73] Assignee: ASEA AB, Vesteras, Sweden

[21] Appl. No.: 730,249

[22] Filed: Oct. 6, 1976

[51] Int. Cl.² .............................................. G01K 7/16
[52] U.S. Cl. ............................................... 73/362 AR
[58] Field of Search .............. 73/362 AR; 340/228 R, 340/248 C, 409

[56] References Cited

U.S. PATENT DOCUMENTS

| | | | |
|---|---|---|---|
| 3,176,284 | 3/1965 | Jones et al. | 340/409 X |
| 3,699,569 | 10/1972 | Lee | 340/409 |
| 3,769,577 | 10/1973 | Schnur et al. | 340/248 C X |
| 3,836,910 | 9/1974 | Bernin | 340/409 X |
| 3,976,985 | 8/1976 | Schalow et al | 73/362 AR |
| 4,017,852 | 4/1977 | Kabat | 340/409 |
| 4,035,787 | 7/1977 | Hornung | 340/228 R |

*Primary Examiner*—Donald O. Woodiel

*Attorney, Agent, or Firm*—Watson, Cole, Grindle & Watson

[57] ABSTRACT

A resistance thermometer measuring system for enabling the temperature of a machine to be observed. This measuring system includes a temperature responsive resistance member which is constructed as part of the machine under observation. The resistance of the temperature responsive resistance member varies as the temperature of the member varies, this variance in temperature corresponds to variances in the temperature of the machine. By sensing the voltage across the resistance member, changes in the temperature are detected. When the voltage being sensed exceeds a preset level, an indicating signal can be generated. On the other hand, if a malfunction occurs in the resistance member, such as a break in the resistance element or the leads, then a fallacious indicating signal might be generated. In order to prevent generation of such an improper signal, a second indicating signal is generated upon occurrence of a malfunction within the resistance member. This second signal is utilized to block the utilization of the first indicating signal.

5 Claims, 2 Drawing Figures

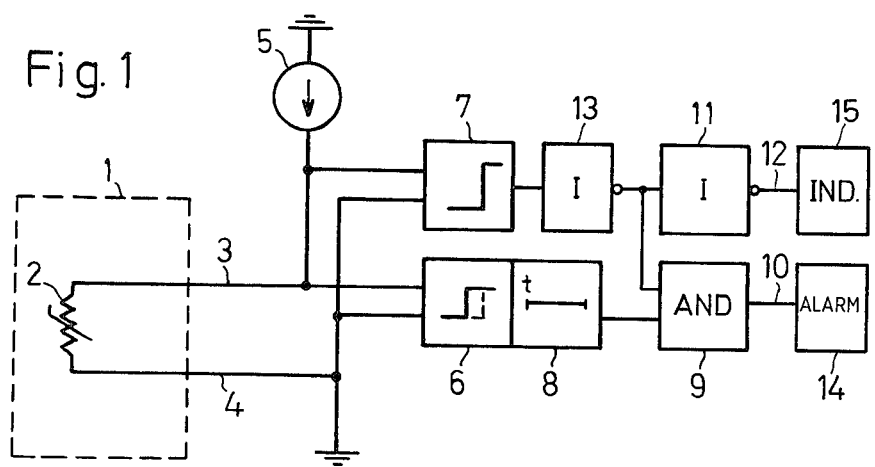
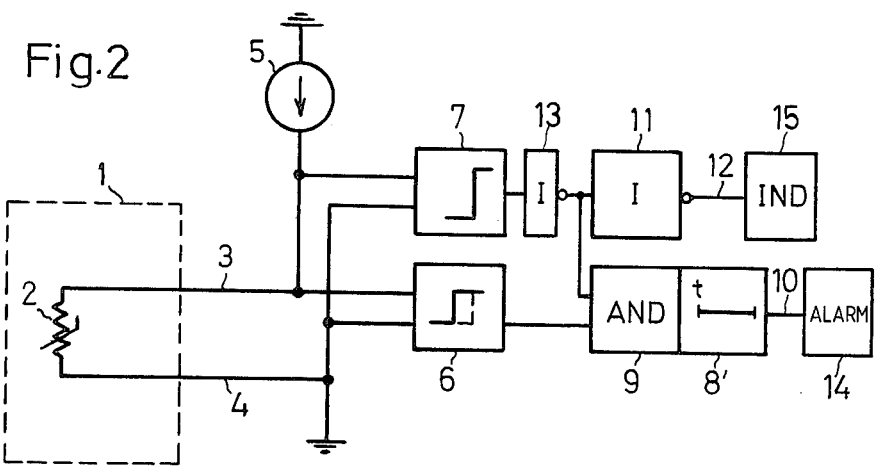

RESISTANCE THERMOMETER MEASURING SYSTEM

BACKGROUND OF THE INVENTION

The present invention involves a resistance thermometer measuring system having provisions for indicating the occurrence of a malfunction.

For observing the temperature in electrical equipment, such as for example, rotary electrical motors, it is common to build in resistance thermometers. Such a thermometer can be provided, for example, as part of the stator and/or one of the bearings. The thermometers are utilized in conjunction with a registering instrument. The registering instrument can be suitably provided with an alarm device, which activates an alarm when the temperature of the resistance thermometer exceeds a preselected level.

In general, the sensing member in such a resistance thermometer is formed by a resistance wire of metal with a positive temperature coefficient, i.e., the resistance of the wire increases with increasing temperature. This involves the drawback, however, that if an interruption or break in the thermometer or in the connection leads occurs, a thermal relay will regard this as an infinitely high temperature thereby triggering the alarm of the registering instrument. Thus, the alarm is triggered even if the temperature conditions in the machine are within a normal range. If the thermal relay is connected for release of the machine upon occurrance of a rising temperature, an interruption, or malfunction, in the resistance thermometer will also cause an undesired release. It, therefore, is desirable to obtain an indication of such a malfunction and to block an unjustified alarm and/or release in response to the malfunction. On the other hand, thermal relays functioning upon falling temperature will normally provide no information at all about such a malfunction in the resistance thermometer. Consequently, the temperature of the machine may fall to any low degree without the thermal relay ever starting to operate.

SUMMARY OF THE INVENTION

An object of the present invention is to provide a resistance thermometer measuring system which provides an indication when there is a malfunction in the resistance thermometer, with such indication being provided without simultaneously causing an alarm signal or release of an object being observed.

In order to accomplish this objective, the resistance thermometer measuring system is provided with a mechanism for detecting the occurrence of a malfunction within the temperature responsive resistance member and in response to such a detection blocking the operation of an alarm and/or the release of an object being supervised. Since an interruption or break in the resistance member will effectively be registered as an infinitely high resistance thereby providing an extremely high voltage to appear to be present across the resistance member, a determination that the voltage across the member has exceeded a preset level can be utilized for indicating the occurrence of a malfunction.

The resistance thermometer measuring system utilizes a temperature responsive member having two connection leads. By providing current to the resistance member and sensing the voltage across the member, changes in the resistance and hence the temperature of the member can be detected. A first voltage sensing circuit is coupled in parallel with the resistance member and serves to provide an output signal when the voltage across the member exceeds a first preset level corresponding to a preselected temperature. A second voltage sensing circuit is also coupled in parallel with the resistance member and serves to provide an output signal when the voltage across the resistance member exceeds a second level. This second voltage level is higher than the first voltage level and is indicative of a malfunction in the resistance member. The output signals from the first and second voltage sensing circuits are fed to a combining circuit which provides an output signal only when the voltage across the resistance member exceeds the first level but is less than the second level.

BRIEF DESCRIPTION OF THE DRAWINGS

FIG. 1 is a schematic block diagram of the resistance thermometer measuring system in accordance with the present invention.

FIG. 2 is a schematic block diagram of a modified embodiment of the resistance thermometer measuring system of the present invention.

DESCRIPTION OF THE PREFERRED EMBODIMENT

In both figures, the object under supervision is marked with a dash-lined rectangle 1. The object may be, for example, a rotating electrical machine. A transducer 2, which is formed by a resistance thermometer, can be built into the stator winding and also possibly the bearings of the machine. The transducer element is connected to a current supply 5 for supplying the transducer with current through lead wires 3 and 4.

A first voltage sensing circuit 6 is connected in parallel with transducer 2 for detecting the voltage across the transducer. As the temperature of the machine increases so does the resistance of transducer 2 and likewise the voltage across the transducer. This first voltage sensing circuit generates an output signal when the voltage across transducer 2 exceeds a first preset level. It is possible to couple an alarm 14 to this first voltage sensing circuit which will then be activated when the voltage across the transducer has exceeded the first level thereby indicating that the temperature of the transducer and hence the object being supervised has exceeded a certain level.

A second voltage sensing circuit 7 is connected in parallel with the transducer element and detects the voltage across the transducer. Circuit 7 is set for a level which is considerably higher than the first, or alarm, level and delivers an output signal only in the event of interruption in the transducer circuit, i.e., interruption either in the transducer element or in the lead wires. Such an interruption consitutes an open circuit in the transduce which causes the resistance of the transducer to appear to be infinitely high and thus the voltage across the inputs of the circuits significantly increases. The level at which circuit 7 is to emit an output signal is referred to as the second, or interruption, level.

Since upon occurrence of an interruption the voltages exceeds both the first and second levels, it is necessary to prevent the device from indicating an interruption in the transducer as being an unpermissibly high temperature in the supervised object. For this purpose, in accordance with the present invention, a delay circuit is provided such as shown in FIG. 1. Delay circuit 8 is connected to circuit 6 for delaying the output signal generated by circuit 6 by a preset time period. The output of the delay circuit is connected to a first input of an AND gate 9. AND gate 9 has an output terminal 10, on which an alarm signal will appear when the alarm level is exceeded. The signal generated by circuit 7 is inverted by inverter 13. A second input of the AND gate is connected to inverter 13 so as to receive the inverted output of second voltage sensing circuit 7. When the interruption level is exceeded, the output of AND gate 9 will be blocked. This inverted output is also connected to a negating or inverter circuit 11 which provides to indicator 15 via terminal 12 an inverted output, which is the actual output of circuit 7 since the signal has been inverted twice. Thus, a signal appears on terminal 12 when the input signal to circuit 7 exceeds the interruption level.

The operation of the system is described below. As long as the temperature of object 1 lies below the alarm level, the output signal from circuit 6 to AND gate 9 is a zero, while the output signal provided by circuit 7 to the AND gate is a one because of the inversion by inverter 13. Thus no output signal occurs on the output of the AND gate as long as the temperature is below the preselected level. If the temperature of the object rises above the preselected, or alarm level, the output signal of circuit 6 becomes a one. After the time period set by delay circuit 8, the AND gate receives ones on both its input terminals and an alarm signal is generated on output terminal 10.

On the other hand, if an interruption occurs, either in transducer element 2 or in either of its lead wires 3 and 4, the voltage supplied to both circuits 6 and 7 rises to a value which exceeds the interruption level. After the time determined by delay circuit 8, circuit 6 emits a signal in the form of a one which is supplied to the first input of AND gate 9. The interruption in the transducer circuit also means that the output signal of circuit 7 changes from zero to one. The output generated by circuit 7 in turn is inverted by inverter 13. Thus, a signal in the form of a zero is supplied by inverter 13 to the second input of the AND gate. In order that the change in the output of circuit 7 may safely take place before the signal from circuit 6 has been delivered to the AND gate, delay circuit 8 is inserted between circuit 6 and AND gate 9. Thus, where there has been an interruption, no signal appears on output terminal 10. Since the output signal from circuit 7 has now changed signs, also the signal on output terminal 12 will change signs so that a signal will appear there which indicates the occurrence of the interruption.

Since the system has two voltage sensing circuits, which are set at different levels, it can determine if an alteration in the resistance in the measuring circuit is due to an increase in temperature of the object or if a malfunction due to an interruption has occurred in the measuring system. This determination is made irrespective of whether the interruption has taken place in the transducer resistor or the associated lead wires. The risk of having an alarm and/or release of an object in case of an interruption, therefore, is eliminated.

The delay device required for proper operation of the system can also be placed as shown by the modified embodiment of FIG. 2, i.e., coupled to the output of AND gate 9. If the change of the signal from circuit 7 to AND gate 9 does not occur before the signal from circuit 6 arrives at the AND gate, then the AND gate has time to deliver a short signal pulse. This pulse, however, will not arrive at output terminal 10 because it is delayed for a preset time period by delay circuit 8. The change of the signal from circuit 7, therefore, is safely made before the delay time in circuit 8 is over and a signal is provided on terminal 10. In the case where an alarm signal is generated due to an increased operating temperature in the object, the resulting action will be similar to what was described above for the device according to FIG. 1.

It is noted that the above description and the accompanying drawings are provided merely to present exemplary embodiments of the present invention and that additional modifications of such embodiments are possible within the scope of this invention without deviating from the spirit thereof.

I claim:

1. A resistance thermomenter measuring system comprising:

a temperature responsive resistance member, said resistance member having two connection leads;

current supply means for supplying current to said resistance member;

a first voltage sensing means coupled in parallel with said resistance member and serving to provide an alarm signal a preselected time after the voltage across said resistance member exceeds a first preset level corresponding to a preselected temperature of said resistance member;

second voltage sensing means coupled in parallel with said resistance member and serving to provide a malfunction indicating signal immediately after the voltage across said resistance member exceeds a second level, such second level being higher than the first level and indicative of a malfunction in said resistance member such malfunction occurring when there is an interruption in the portion of the circuit formed by said resistance member and its connecting leads; and, means for combining said alarm signal and said malfunction indicating signal and for blocking said alarm signal when both signals appear simultaneously.

2. Apparatus as defined in claim 1, wherein: said first voltage sensing means includes means for delaying its output signal by a preselected time delay; said second voltage sensing means includes means for inverting its output signal; and, said signal combining means includes an AND gate having a first input coupled to the delayed output of said first voltage sensing means and a second input coupled to the inverted output of said second voltage sensing means.

3. Apparatus as defined in claim 1, wherein: said second voltage sensing means includes means for inverting its output signal; and, said signal combining means includes an AND gate having a first input coupled to receive said alarm signal of said first voltage sensing means and a second input coupled to the inverted output of said second voltage sensing means and said signal combining means further includes delay means coupled to the output of said AND gate for delaying the output signal by a preselected time delay.

4. Apparatus as defined in claim 1, further comprising first indicating means coupled to said signal combining means and providing an indication in response to an output provided by said signal combining means.

5. Apparatus as defined in claim 1, further comprising second indicating means coupled to said second voltage sensing means and providing an indication upon the occurrence of a malfunction within said resistance member.

* * * * *